Figure 1:
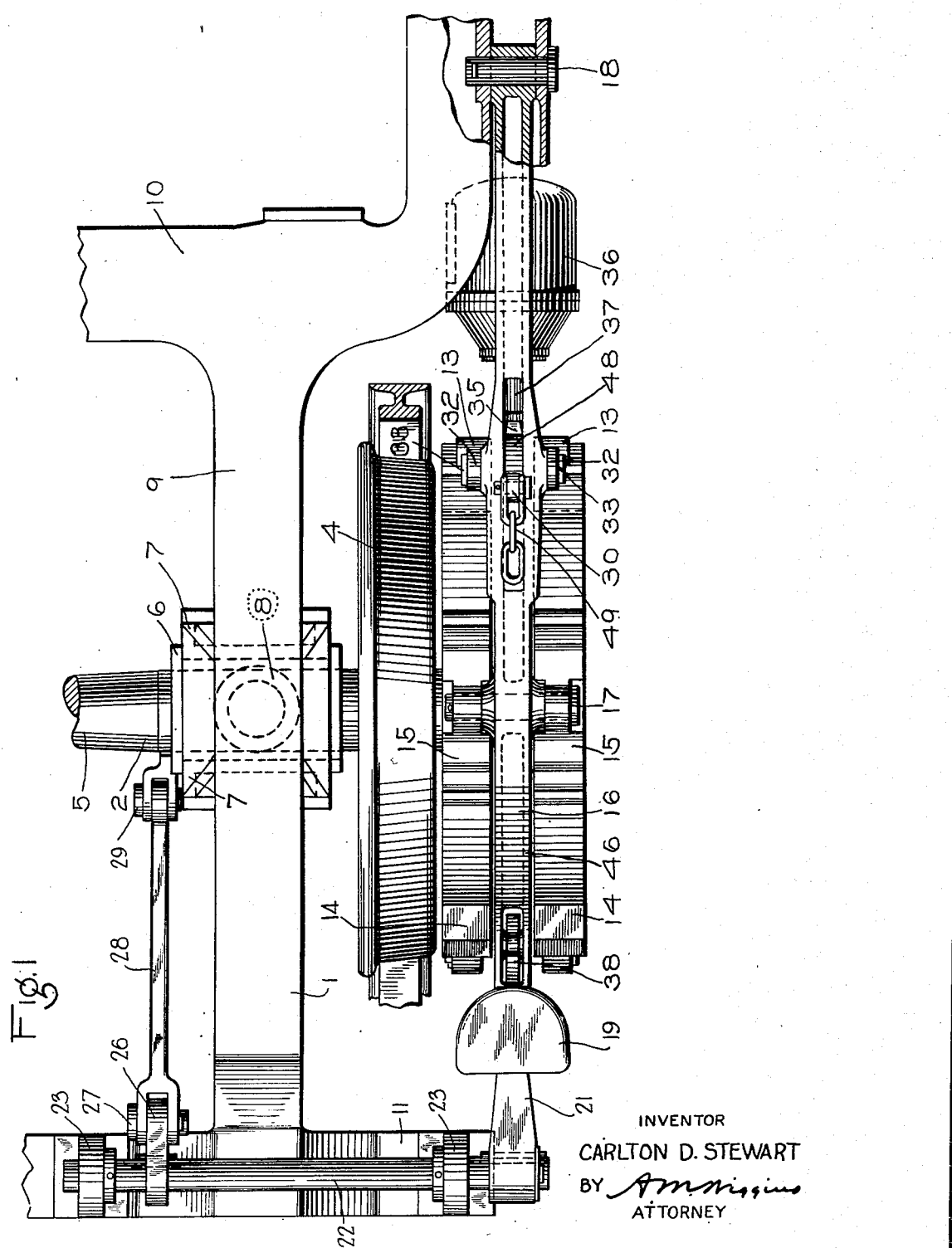

Aug. 20, 1940.  C. D. STEWART  2,211,915
BRAKE MECHANISM
Filed Feb. 18, 1939  3 Sheets-Sheet 1

INVENTOR
CARLTON D. STEWART
BY *A. M. Higgins*
ATTORNEY

Aug. 20, 1940.  C. D. STEWART  2,211,915
BRAKE MECHANISM
Filed Feb. 18, 1939  3 Sheets-Sheet 2

INVENTOR
CARLTON D. STEWART
BY
ATTORNEY

Aug. 20, 1940.　　　C. D. STEWART　　　2,211,915
BRAKE MECHANISM
Filed Feb. 18, 1939　　　3 Sheets-Sheet 3

INVENTOR
CARLTON D. STEWART
BY
ATTORNEY

Patented Aug. 20, 1940

2,211,915

UNITED STATES PATENT OFFICE 2,211,915

BRAKE MECHANISM

Carlton D. Stewart, Wilkinsburg, Pa., assignor to The Westinghouse Air Brake Company, Wilmerding, Pa., a corporation of Pennsylvania Application February 18, 1939, Serial No. 257,129

22 Claims. (Cl. 188—190)

This invention relates to brake mechanisms for railway vehicle trucks and more particularly to that type of brake mechanism disclosed in my prior pending application for U. S. Patent, Serial No. 214,517, filed June 18, 1938, in which, in effecting an application of the brakes, downwardly directed forces set up in the mechanism upon the frictional braking engagement of one or more brake shoes with a wheel and axle assembly of the truck will be transmitted, through the medium of another brake shoe, to the assembly instead of to the truck frame.

The brake mechanism disclosed in the above mentioned pending application is of the clasp type and comprises a single brake cylinder and a single system of operatively connected levers and rods for actuating the clasp arranged brake shoes into and out of braking engagement with a wheel and axle assembly of the truck, and further comprises a brake carrier which normally supports the system from the truck frame and which is actuated by said system, when an application of the brakes is initiated, to move another brake shoe into engagement with the wheel and axle assembly to assist in opposing rotation of the assembly and to support the greater portion of the load imposed on the system by the clasp arranged brake shoes while such shoes are in frictional braking engagement with the wheel and axle assembly. Thus the additional load due to braking is substantially wholly carried by the wheel and axle assembly instead of by the truck frame.

The brake carrier is pivotally connected to one end of the truck frame and at the other end rests upon a release spring which is carried by the truck frame. Located above the release spring and interposed between and engaging the carrier and a portion of the truck frame is a cushioning spring which, when the brake rigging is in release position, is adapted to cushion upward movement of this end of the member under the influence of service shocks to which a truck is subjected in train service, downward movement being cushioned by the release spring.

In this type of brake mechanism the brake carrier and consequently the brake shoes and the several operatively connected brake levers and rods for actuating the clasp arranged brake shoes as well as the brake cylinder for actuating the brake levers and rods, will all move downwardly as a unit with the truck frame when, due to increased load on the vehicle or to service shocks to which the truck may be subjected, such movement of the truck frame occurs. This will not be objectionable in trucks where the truck frame supporting springs are heavy enough to limit the downward movement of the truck frame to the usual distance. However, in modern passenger car truck constructions the truck frame supporting springs are, for the sake of easier riding, being so designed as to permit greater vertical movement of the truck frame relative to the wheel and axle assembly than heretofore. Obviously this new spring arrangement will, due to the increased spring deflection, necessitate the spacing of the brake shoes carried by the brake carrier a materially greater distance from the brake drum or wheel than with the old spring arrangement in order to prevent unwanted engagement of the shoes with the assembly. In some cases this spacing may be so great as to render the brake mechanism impracticable, in that it will permit the clasp arranged elements to move downwardly to a position where their effectiveness will be impaired.

In view of this the principal object of the present invention is to provide a brake mechanism of the above mentioned type with means whereby, while the several parts of the brake mechanism are in their release position, the brake carrier will be maintained spaced from the wheel and axle assembly a substantially constant distance regardless of the degree of relative vertical movement between that portion of the truck frame and the wheel and axle assembly with which the brake mechanism is associated.

According to this object the more or less free end of the brake carrier is maintained positioned from the wheel and axle assembly by means of a supporting mechanism which is operatively connected to the wheel and axle assembly, truck frame and free end of the carrier, there being a resilient lost motion connection between the mechanism and the carriers to permit the carrier to move relative to the supporting mechanism while an application of the brakes is being effected and while the brakes are being released.

Other objects and advantages will be apparent from the following more detailed description of the invention.

Figure 2:
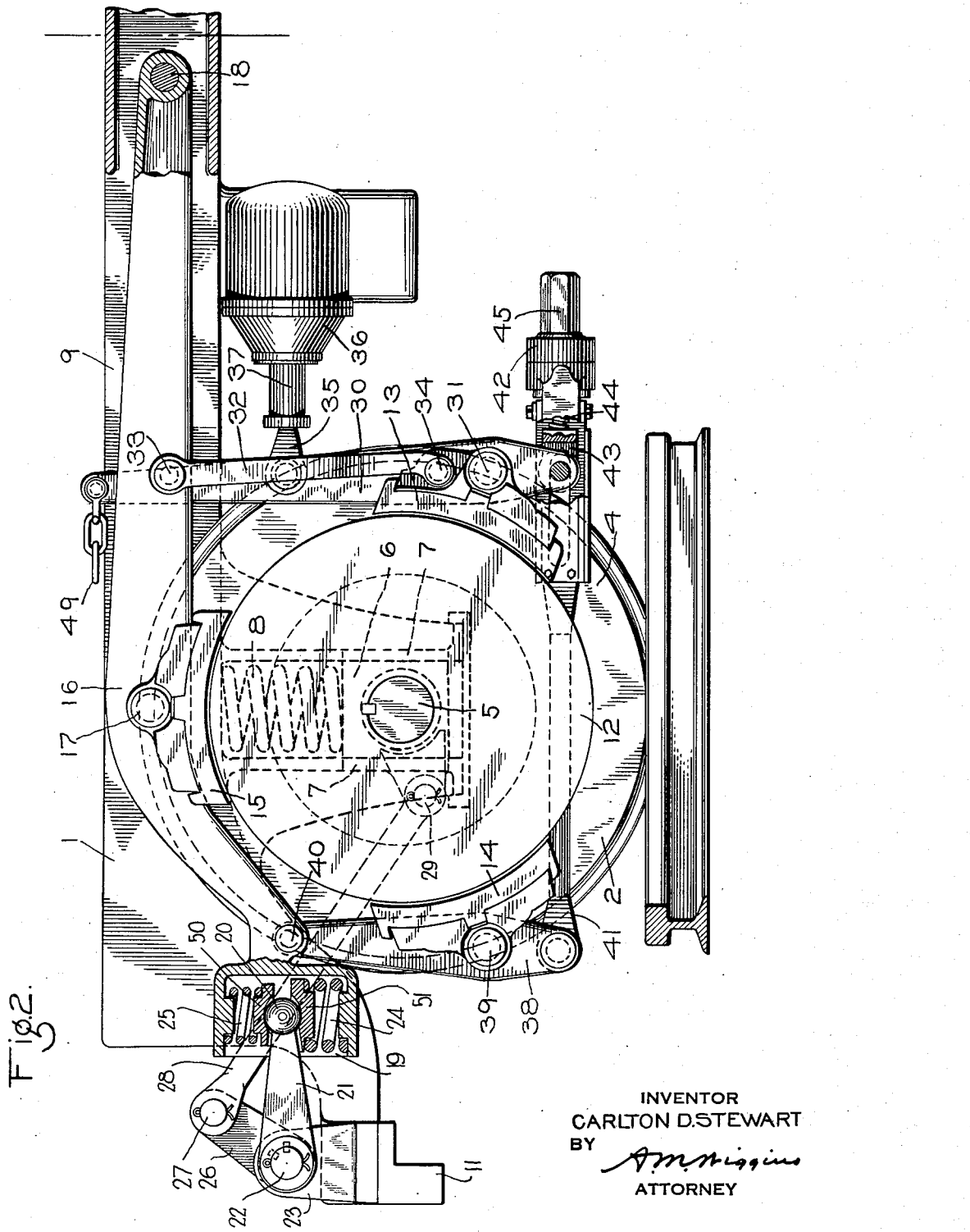
Figure 3:
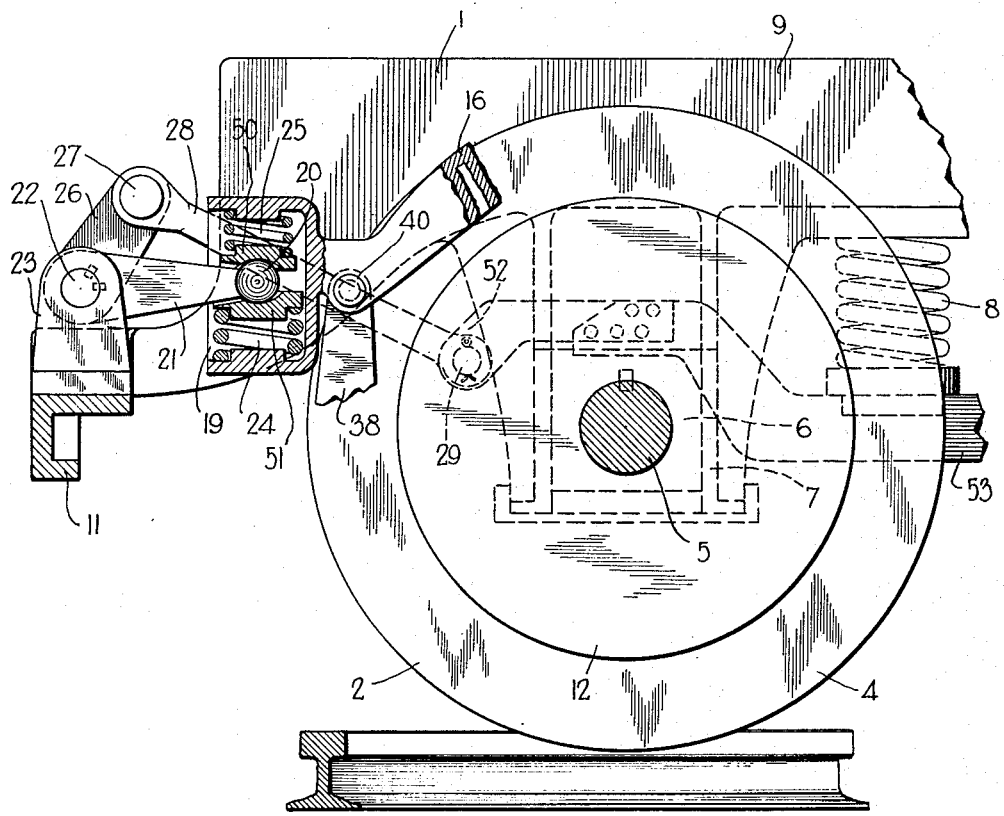
Figure 4:
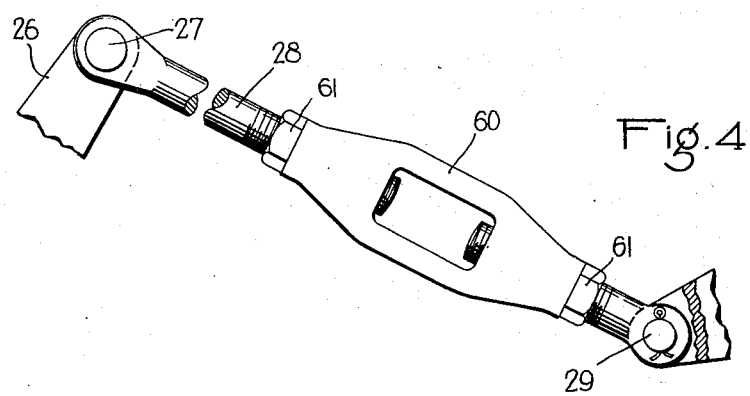

In the accompanying drawings Fig. 1 is a fragmentary plan view of a portion of a railway vehicle truck and brake mechanism embodying the invention; Fig. 2 is a side elevational view of the same, portions of the mechanism and the truck frame being shown in section to more clearly illustrate the invention; Fig. 3 is a fragmentary longitudinal sectional view of a railway vehicle truck taken between the vehicle wheels and illustrating the invention embodied in an equalizer type of truck; and Fig. 4 is a fragmentary detail view of a modification of the mechanism shown in Figs. 2 and 3.

In Figs. 1 and 2 of the drawings the invention is shown embodied in a railway vehicle truck of the type having a cast metal truck frame 1 and two longitudinally spaced wheel and axle assemblies 2, each of which assemblies comprises laterally spaced wheels 4 which may be secured in any desired manner to the axle 5 so as to rotate therewith, only one end portion of one of such assemblies being shown.

Between the wheels and at each side of the truck each axle is suitably journaled in a journal bearing 6, loosely mounted in spaced pedestal jaws 7 depending downwardly from the truck frame, and seated on the journal bearings and resiliently supporting the truck frame vertically are springs 8.

The truck frame differs somewhat from the conventional type of frame in that the side frames 9 thereof are inset or recessed opposite each wheel to accommodate the wheel, and in that the pedestal jaws and journal bearings are disposed inboard of the wheels. The side frames 9 may be integrally connected together in the usual manner by transversely extending transoms 10 and transversely extending end pieces 11.

Located outboard of each wheel of each wheel and axle assembly, but adjacent thereto, are two spaced annular brake drums 12 which are preferably integral with each other and which are secured to the outer end of the axle so as to rotate therewith. Each of these brake drums is provided with an outer peripheral braking surface which is adapted to be frictionally engaged by brake elements 13, 14 and 15 radially arranged in pairs about the drum, the elements 13 and 14 being located below the horizontal center line of the drum and at opposite sides thereof and the element 15 being located above the drum on substantially the vertical center line thereof. It will here be understood that each brake element may comprise the usual brake shoe and brake shoe head and since this construction of head and shoe is well known the elements will, for simplification, be hereinafter referred to by the term "brake shoe" or "brake shoes."

In the present embodiment of the invention there is a complete brake mechanism for each wheel of the truck and since the mechanism for each wheel is identical in structure, the following description will for the sake of clarity be more or less limited to a single mechanism and the portions of the truck shown in the drawings.

The brake shoes 15 are pivotally carried by a combined lever and brake rigging supporting member 16 which extends longitudinally of the truck on the outer side of the adjacent side frame 9 and above the brake drum, the brake shoes being arranged one on each side of the member and being operatively connected to the member by means of a transversely extending pin 17. For the sake of simplicity this member 16 will be hereinafter referred to by the term "brake carrier."

The inner end of the brake carrier 16 is pivotally connected to the adjacent side frame 9 by means of a transversely extending pin 18. The outer end of the carrier is made in the form of a pocket 19 having vertically spaced top and bottom walls, which pocket is open at the end of the carrier for the reception of an arm 21 which is rigidly secured to a transversely extending shaft 22 which is rockably mounted in laterally spaced lugs 23 preferably formed integral with and extending upwardly from the end piece 11 of the truck frame. The end of this arm is made in the form of a sphere 20. Within the pocket the spherical portion of the arm is slidably engaged by top and bottom spring seats 50 and 51, respectively, contained in the pocket 19. Interposed between and operatively engaging the top wall of the pocket and the top spring seat 50 is a spring 25 which is of such a value that it will support the brake carrier and thereby the associated parts of the brake rigging in their normal release position as shown as well as effect the return of the carrier to its release position in releasing the brakes. It should here be mentioned that the value of the spring 25 is considerably less than that of the truck frame supporting spring 8 so that it may be compressed without danger of compressing the spring 8.

Also contained in the pocket 19 and interposed between and operatively engaging the lower wall of the pocket 19 and the lower spring seat 51 is a spring 24 which is adapted to oppose undue upward movement of the brake carrier 16 relative to the truck frame in response to service shocks when the several parts of the mechanism are in release position and the truck is in motion.

Located inboard of the side frame 9 is a strut member 26 which is pivotally connected at its upper end by a pin 27 to an arm 26 rigidly secured to the shaft 22 and which is pivotally anchored at its lower end against endwise movement to the journal bearing 6 by means of a pin 29.

The brake shoes 13 at each end of each wheel and axle assembly are arranged one on each side of a vertically disposed brake cylinder lever 30 and are pivotally connected to such lever intermediate its ends by means of a transversely extending pin 31.

For supporting the lever 30 and the brake shoes 13 operatively connected thereto, hangers 32 are provided which are arranged one on each side of the lever. Each hanger at its upper end is pivotally connected to a horizontally disposed trunnion carried by and extending outwardly from one side of the brake carrier 16, which trunnion, in the present embodiment of the invention, is in the form of a pin 33. The lower end of each hanger is operatively connected to one of the brake shoes 13 by means of a pin 34, which pin, in the present embodiment of the invention, is located at a point slightly above the pin 31. It will here be noted that the hanger supports the brake cylinder lever through the medium of the brake shoes 13.

Above the pins 31 and 34 the lever 30 is operatively connected to the outer end of the push rod 35 of a brake cylinder device 36 which may be of the conventional type having a cylinder casing in which there is operatively mounted a piston having a hollow piston rod 37 in which the push rod 35 is rockably mounted in the usual manner, which piston is responsive to the pressure of fluid supplied to the cylinder portion to actuate the lever to effect an application of the brakes, and which operates upon the venting of fluid from the cylinder portion to permit the lever to assume its normal release position under the influence of the force of gravity as is usual. Since such brake cylinder devices are so well known in the fluid pressure brake art a detailed showing of all of the parts thereof is deemed unnecessary.

The brake shoes 14 at each end of each wheel and axle assembly are arranged one on each side of a vertically disposed hanger lever 38 and are pivotally connected to the lever by means of a transversely extending pin 39. The upper end of this lever is pivotally connected to the outer end portion of the brake carrier 16 by means of a pin 40.

The lower ends of the brake cylinder lever 30 and the hanger lever 38 are operatively connected together by means of a longitudinally extending connector which, in the present embodiment of the invention, comprises a rod 41 which is operatively connected at one end to the hanger lever 38 and at its other end to the cylinder 30 through the medium of the slack adjuster 42 carried by the rod 41.

The slack adjuster 42 may be of any conventional type having a movable cross head 43 which is operatively connected to the lower end of the brake cylinder lever and which may be actuated by a screw mechanism 44 adapted to be manually operated through the medium of an adjusting nut 45.

As hereinbefore mentioned the brake drums 12 are made integral with each other and the braking surfaces thereof are separated in a direction longitudinally of the axle by a circular groove 46 which is of sufficient width and depth to accommodate the connector 41 which extends into the plane of the drum.

The upper end portion of each brake cylinder lever 30 extends through a vertically extending opening 48 formed in the brake carrier 16, and above the member has a hand brake pull rod or chain 49 operatively connected thereto, which pull rod or chain is adapted to be actuated through the medium of the usual manually operable brake mast.

With the brake cylinder device 36 devoid of fluid under pressure the several parts of the brake rigging will be in release position as shown and will be maintained in this position by the force of gravity or by a release spring when such a spring is employed.

It will here be noted that since the journal bearing 6 is fixed against vertical movement relative to the wheel and axle assembly, the arm 21, which is anchored to the journal bearing through the medium of the shaft 22, arm 26, pin 27 and strut member 28, serve to support the outer end of the brake carrier in its brake releasing position, the spring 25 providing a resilient lost motion connection between the arm 21 and the carrier for permitting relative movement between the carrier and arm in effecting either the application or the release of the brakes as will hereinafter more fully appear. It should here be mentioned that the portion of the weight of the brake rigging which is transmitted to the outer ends of the brake carrier 16 is insufficient to compress the spring 25 and therefore the spring will maintain the carrier in its normal release position in which position the associated brake shoes 15 are out of contact with the brake drum.

*Automatic positioning of the brake carrier to compensate for relative vertical movement between the truck frame and wheel and axle assembly*

Assuming the truck to be lightly loaded as is the case when the vehicle is empty, the several parts of the truck and brake mechanism will be in the position in which they are shown in Fig. 2.

Now when the load on the truck is increased, the truck frame will move downwardly relative to the wheel and axle assembly and compress the truck supporting spring 8. The inner or pivoted end of the brake carrier 16 and the shaft 22 of the brake carrier adjusting mechanism will move downwardly with the truck frame, and as the shaft is thus moved, the strut member 28, acting through the medium of the pin 27 and arm 26 causes the shaft 22 and thereby the arm 21 to rock in a counterclockwise direction. This arm 21 as it is thus actuated, acts through the medium of the release spring 25 to move the outer end of the brake carrier upwardly about its pivot pin 18 a sufficient distance to prevent the downward movement of the pivoted end of the carrier from causing the brake shoes 15 to engage the brake drums 12.

The arms 26 and 21 are so proportioned that this upward movement of the outer end of the carrier will substantially offset or compensate for the downward movement of the pivoted end of the carrier so as to maintain the brake shoes 15 spaced away from the braking surfaces or the brake drums a distance substantially the same as shown in Fig. 2. It will here be noted that the distance between the pivot pin 17 for the brake shoes 15 and the pivot pin 18 for the brake carrier is such that when the outer end of the carrier is adjusted to compensate for the downward movement of the inner or pivoted end, the brake shoes 15 may assume a position at a slight angle to the right of the position in which they are shown in Fig. 2 but this change in position will be negligible. In fact this change may be so slight that for all practical purposes the brake shoe 15 may be considered as remaining in substantially the same position with relation to the brake drum as they are shown in Fig. 2. From this it will be apparent that when the brake carrier is being adjusted the brake shoes 13 and 14 will also remain in substantially the same position in which they are shown in Fig. 2.

From the foregoing description it will be seen that when there is relative movement between the truck frame and the wheel and axle assembly that the brake carrier 16 will be automatically adjusted so that the brake shoes 13, 14 and 15 will remain in substantially their original position.

*Application of the brakes*

When it is desired to effect an application of the brakes, fluid under pressure is admitted in the usual manner to the brake cylinder device 36. In response to the pressure of fluid thus admitted, the brake cylinder device functions to actuate the brake cylinder lever 30 associated therewith and thereby the adjacent hanger lever to cause the brake shoes 13 and 14 to frictionally engage the peripheral braking surfaces of the brake drums 12. With these brake shoes in such engagement the increasing force being applied to the brake shoes through the operation of the brake cylinder devices causes the shoes to move downwardly along the peripheral surfaces of the drum. the downwardly directed force, due to such action, being transmitted through the brake cylinder lever 30, the hangers 32 and the hanger lever 38 to the brake carrier 16 causing the carrier to move downwardly about the pin 18 and against the opposing action of the spring 25 until such time as the brake shoes 15 engage the drums. At this time downward movement of the carrier 16 and brake rigging will stop since the member will now be rigidly supported by both the truck frame and the brake drums. It will here be understood that the spring 25 while it is thus being compressed will be supported by the arm 21 which is held against downward rocking movement by the strut connection to the journal bearing 6. If for any reason the truck frame should move downwardly relative to the wheel and axle assembly when the brake shoes 15 are in braking engagement with the brake drums the arm 21 will move upwardly and further compress the spring 25, but this action will have no material effect upon the brake carrier 16. With the wheel 4 and brake drums 12 rotating in a counterclockwise direction, the drag of the drums on the brake shoes 14 will cause a further downwardly directed pull to be applied to the hanger lever 38 and thereby to the outer end of the brake carrier 16, and with the wheels and brake drums rotating in the opposite direction the drag of the drums on the brake shoes 13 will cause a further downwardly directed pull to be applied to the hangers 32 and thereby to the brake carrier, thus, in either case the force applied to the brake shoes 15 is augmented.

It will be seen that with the brake rigging in application position, the brake shoes 15, besides serving to assist in supporting the brake carrier 16 and thereby the brake rigging, also act to resist rotary movement of the brake drums, thus materially increasing the braking action on the wheel and axle assembly for any given brake applying force applied to the rigging either by the brake cylinder or manually through the medium of the chain 49.

Release of the brakes

When it is desired to release the brakes, fluid under pressure is vented from the brake cylinder device 36. When this is accomplished the usual release spring, not shown, in the brake cylinder device causes the brake cylinder piston and hollow piston rod to move inwardly to their normal release position. At the same time, the force of gravity causes the brake shoes 13 and 14 and the several parts of the brake rigging associated therewith to assume their release position as shown in Fig. 2. It will here be noted that as the brake shoes 13 and 14 move out of contact with the brake drums 12 the compressed spring 25 acts to raise the outer end of the brake carrier 16, thereby moving the brake shoes 15 out of engagement with the drums, the upward movement of the carrier ceasing when the spring has reached its limit of expansion.

Description of the modification shown in Fig. 3

In Fig. 3 of the drawings the invention is shown applied to a railway vehicle truck of the equalizer type.

In this type of truck the brake drums 12 will be mounted on the axle 5 of the wheel and axle assembly inboard of the wheel 4 and in which the strut member 28 of the brake carrier adjusting mechanism is anchored at its lower end to a member 52 which may be integral with or rigidly secured to the equalizer bar 53. The brake carrier 16, brake shoes 13, 14 and 15, the mechanism for actuating the brake shoes 13 and 14 and the arm 21 of the brake carrier adjusting mechanism will also be located inboard of the wheel 4. The strut 28 of the adjusting mechanism will however be located on the outer side of the truck frame.

Slack take-up mechanism shown in Fig. 4

As shown in Fig. 4 of the drawings the strut 28 of each shown form of the adjusting mechanism for the brake carrier 16 may be slightly modified to include a turn buckle 60 which is operative to vary the length of the strut member and thereby actuate the arm 21 of the mechanism to vary the position of the outer end of the carrier to provide the desired clearance between the braking surfaces of the brake shoes 15 and the brake drums 12 when the brakes are released. The turn buckle is locked in position against accidental operation by check nuts 61 which are arranged one at each end of the turn buckle.

Slack take-up operation

In the brake mechanism shown in Figs. 2 and 3 the carrier 16 cannot be adjusted to take-up slack due to wear of the brake shoes 15 but can be adjusted to take-up slack due to the wear of the brake shoes 13 and 14 and wear of the actuating members therefor.

To take-up slack in these mechanisms the adjusting nut 45 of the slack adjuster 42 is rotated to cause the adjuster cross head 43 to move forwardly to shorten the effective length of the connector 41 until such time as the brake shoes 13 and 14 are in their proper position with relation to the brake drum. From this it will be seen that the slack in the brake rigging may be readily taken up.

When the strut member 28 is constructed in the manner shown in Fig. 4 slack in the brake mechanism due to wear of the brake shoes 13, 14 and 15 or any other part of the mechanism may be readily taken up by first adjusting the length of the strut member and then operating the slack adjuster 42 to vary the effective length of the connector 41 which operatively connects the levers 30 and 38. In this connection it will be noted that when slack is to be taken up, one of the check nuts 61 is slacked back to release the turn buckle 60 and the turn buckle is then rotated to shorten the strut member 28. Since the lower end of the strut member is anchored against longitudinal movement, this shortening of the member causes the arm 26, shaft 22 and arm 21 to rock in clockwise direction relative to the truck frame, thereby permitting the outer end of the carrier and the brake shoes 15 carried thereby to move downwardly toward the brake drums 12. When the brake shoes 15 have been lowered to their proper position with relation to these brake drums, rotation of the adjusting turn buckle 60 is stopped and the check nuts 61 are then turned into locking engagement with the turn buckle.

Following this adjustment of the brake shoes 15, the slack adjuster 42 is actuated to adjust brake shoes 13 and 14 in the same manner as described in connection with the apparatus shown in Figs. 2 and 3.

General considerations

While the invention has been described in detail in connection with a brake drum which is carried by the wheel and axle assembly it will be understood that in cases where sufficient braking can be obtained by the use of three brake shoes each brake mechanism may be so arranged that the shoes will engage the tread of a wheel of the assembly. In such cases the brake drums will of course be omitted.

Modifications in the structures illustrated and described may be made without departing from the spirit of my invention, and I do not therefore wish to be limited otherwise than by the scope of the appended claims.

Having now described my invention, what I claim as new and desire to secure by Letters Patent, is:

1. In a brake mechanism for a railway vehicle truck of the type comprising a wheel and axle assembly and a truck frame which is capable of vertical movement relative to the assembly, in combination, a member carried by the truck frame movable vertically relative thereto into and out of engagement with said assembly, and means cooperating with said truck frame and wheel and axle assembly for normally maintaining said member out of engagement with the assembly regardless of the degree of relative vertical movement between the truck frame and assembly.

2. In a brake mechanism for a railway vehicle truck of the type comprising a wheel and axle assembly and a truck frame which is capable of vertical movement relative to the assembly, in combination, a brake element carried by the truck frame and movable vertically relative thereto into and out of engagement with said assembly, and means cooperating with said truck frame and wheel and axle assembly for normally maintaining said element against movement in a direction toward the assembly in response to relative vertical movement between the truck frame and assembly.

3. In a brake mechanism for a railway vehicle truck of the type comprising a wheel and axle assembly and a truck frame which is capable of vertical movement relative to the assembly, in combination, a brake element carried by the truck frame and movable vertically relative thereto into and out of engagement with said assembly, and means responsive to relative vertical movement between said truck frame and wheel and axle assembly for normally preventing unwanted engagement between said element and assembly.

4. In a brake mechanism for a railway vehicle truck of the type comprising a wheel and axle assembly and a truck frame which is capable of vertical movement relative to the assembly, in combination, a brake element carried by the truck frame and movable vertically relative thereto into and out of engagement with said assembly, and means responsive to downward vertical movement of the truck frame relative to said wheel and axle assembly for normally supporting said element out of engagement with said assembly.

5. In a brake mechanism for a railway vehicle truck of the type comprising a wheel and axle assembly and a truck frame which is capable of vertical movement relative to the assembly, in combination, a brake element carried by the truck frame and movable vertically relative thereto into and out of engagement with said assembly, and means carried by said truck frame and cooperating with said wheel and axle assembly for normally supporting said element out of engagement with the assembly, said means being automatically adjustable to compensate for the degree of movement between the truck frame and assembly.

6. In a brake mechanism for a railway vehicle truck of the type comprising a wheel and axle assembly and a truck frame which is capable of vertical movement relative to the assembly, in combination, a brake element carried by the truck frame and movable vertically relative thereto into and out of engagement to said assembly, and means cooperating with said truck frame and wheel and axle assembly for normally maintaining said element positioned a substantially uniform distance from said assembly regardless of the degree of relative vertical movement between the truck frame and assembly.

7. In a brake mechanism for a railway vehicle truck of the type comprising a wheel and axle assembly and a truck frame which is capable of vertical movement relative to the assembly, in combination, a brake element carried by the truck frame and movable vertically relative thereto into and out of engagement with said assembly, and means cooperating with said truck frame and wheel and axle assembly for normally maintaining said element against unwanted movement in a direction toward the assembly in response to relative vertical movement between the truck frame and assembly, said means being adapted to permit intentional movement of the element into engagement with said assembly.

8. In a brake mechanism for a railway vehicle truck of the type comprising a wheel and axle assembly and a truck frame which is capable of vertical movement relative to the assembly, in combination, a brake element, a brake carrier carried by the truck frame and movable relative thereto for moving said brake element into and out of engagement with the assembly, another brake element carried by said carrier and movable into and out of engagement with said assembly and adapted when in engagement with the assembly to actuate said brake carrier to move the first mentioned brake element into engagement with the assembly and means yieldably opposing movement of the carrier by said other brake element, said means comprising an automatically adjustable mechanism cooperating with said carrier, truck frame and wheel and axle assembly for normally maintaining the carrier positioned a substantially uniform distance from the assembly regardless of the degree of relative movement between the truck frame and assembly.

9. In a brake mechanism for a railway vehicle truck of the type comprising a wheel and axle assembly and a truck frame which is capable of vertical movement relative to the wheel and axle assembly, in combination, a brake element, a member pivotally connected at one end to the truck frame and rockable relative to the truck frame in a vertical plane for moving said element into and out of engagement with the wheel and axle assembly, the pivoted end of said member being movable with the truck frame, and means normally supporting the other end of said member, said means being responsive to vertical movement between the truck frame and wheel and axle assembly for moving said other end of the member upwardly to compensate for the downward movement of the pivoted end of the member to maintain said brake element out of unwanted engagement with the wheel and axle assembly.

10. In a brake mechanism for a railway vehicle truck of the type comprising a wheel and axle assembly and a truck frame which is capable of vertical movement relative to the wheel and axle assembly, in combination, a brake element, a member pivotally connected at one end to the truck frame and rockable relative to the truck frame in a vertical plane for moving said element into and out of engagement with the wheel and axle assembly, the pivoted end of said member being movable with the truck frame, and means carried by said truck frame and cooperating with said wheel and axle assembly for normally supporting said other end of the member and operative in response to downward vertical movement of the truck frame relative to the wheel and axle assembly for adjusting said other end of the member to compensate for the downward movement of the pivoted end of the member to prevent unwanted engagement of the brake element with the wheel and axle assembly.

11. In a brake mechanism for a railway vehicle truck of the type comprising a wheel and axle assembly and a truck frame which is capable of vertical movement relative to the wheel and axle assembly, in combination, a brake element, a member pivotally connected at one end to the truck frame and rockable relative to the truck frame in a vertical plane for moving said element into and out of engagement with the wheel and axle assembly, the pivoted end of said member being movable with the truck frame, and means carried by said truck frame and cooperating with said wheel and axle assembly for supporting the other end of said assembly and thereby said brake element, said means being operative upon vertical movement of the truck frame relative to the wheel and axle assembly for moving said other end of the member upwardly to compensate for the downward movement of the pivoted end of the member to thereby maintain said brake element out of unwanted engagement with the wheel and axle assembly.

12. In a brake mechanism for a railway vehicle truck of the type comprising a wheel and axle assembly and a truck frame which is capable of vertical movement relative to the wheel and axle assembly, in combination, a brake supporting structure pivotally mounted at one end of the truck frame for movement relative to the truck frame into and out of engagement with the wheel and axle assembly, the pivoted end of the structure being movable vertically with the truck frame relative to the assembly, and means supporting the other end of the structure and operative upon vertical movement of the truck frame relative to the wheel and axle assembly to actuate the structure to compensate for the downward movement of the pivoted end of the structure to thereby prevent the structure from engaging the wheel and axle assembly.

13. In a brake mechanism for a railway vehicle truck of the type comprising a wheel and axle assembly and a truck frame which is capable of vertical movement relative to the assembly, in combination, a brake element carried by the truck frame and movable relative thereto into and out of engagement with said assembly, means cooperating with said truck frame and wheel and axle assembly for normally maintaining said element out of engagement with the assembly regardless of the degree of relative movement between the truck frame and assembly, and means included in the first mentioned means operative to adjust the position of said brake element with respect to said assembly to compensate for wear which may occur between said element and said wheel and axle assembly.

14. In a brake mechanism for a railway vehicle truck of the type comprising a wheel and axle assembly and a truck frame which is capable of vertical movement relative to the wheel and axle assembly, in combination, a brake supporting structure pivotally mounted at one end of the truck frame for movement relative to the truck frame into and out of engagement with the wheel and axle assembly, the pivoted end of the structure being movable vertically with the truck frame relative to the assembly, and means supporting the outer end of the structure and operative upon vertical movement of the truck frame to actuate the structure to compensate for the downward movement of the pivoted end of the structure to thereby prevent the structure from engaging the wheel and axle assembly, said means being operative to adjust the position of the structure with relation to the assembly to compensate for wear between the structure and the assembly.

15. In a brake mechanism for a railway vehicle truck of the type comprising a wheel and axle assembly and a truck frame which is capable of vertical movement relative to the wheel and axle assembly, in combination, a brake supporting structure pivotally mounted at one end of the truck frame for movement relative to the truck frame into and out of engagement with the wheel and axle assembly, the pivoted end of the structure being movable vertically with the truck frame relative to the assembly, means cooperating with said truck frame and wheel and axle assembly for supporting the other end of the structure and operative upon vertical movement of the truck frame to actuate the structure to compensate for the downward movement of the pivoted end of the structure to thereby prevent the structure from engaging the wheel and axle assembly, and means for actuating the first mentioned means for adjusting the position of said structure with relation to the assembly to compensate for wear.

16. In a brake mechanism for railway vehicle truck of the type comprising a wheel and axle assembly and a truck frame which is capable of vertical movement relative to the wheel and axle assembly, in combination, a brake supporting structure pivotally mounted at one end of the truck frame for movement relative to the truck frame into and out of engagement with the wheel and axle assembly, the pivoted end of the structure being movable vertically with the truck frame relative to the assembly, an arm rockably mounted on said truck frame normally supporting the other end of said structure, and a strut associated with said wheel and axle assembly adapted to actuate said arm upon vertical movement of the truck frame relative to the wheel and axle assembly to maintain said structure out of unwanted engagement with the wheel and axle assembly.

17. In a brake mechanism for a railway vehicle truck of the type comprising a wheel and axle assembly and a truck frame which is capable of vertical movement relative to the wheel and axle assembly, in combination, a brake supporting structure pivotally mounted at one end to the truck frame for movement relative to the truck frame into and out of engagement with the wheel and axle assembly, the pivoted end of the structure being movable vertically with the truck frame relative to the assembly, an arm rockably mounted on said truck frame normally supporting the other end of said structure, a strut member associated with said wheel and axle assembly adapted to actuate said arm upon vertical movement of the truck frame relative to the wheel and axle assembly to maintain said structure out of unwanted engagement with the wheel and axle assembly, and adjusting means embodied in said strut member for actuating said arm to adjust said structure to compensate for wear between the interengaging surfaces of structure and wheel and axle assembly.

18. In a brake mechanism for a railway vehicle truck of the type comprising a wheel and axle assembly and a truck frame which is capable of vertical movement relative to the wheel and axle assembly, in combination, a brake mechanism for said wheel and axle assembly, and a member normally supporting said mechanism and being movable relative to the truck frame by said mechanism, when effecting an application of the brake, into engagement with the wheel and axle assembly, said member being pivotally connected at one end to the truck frame for movement by the brake mechanism, means cooperating with said truck frame and wheel and axle assembly for normally supporting the other end of said member and operative in response to vertical movement of the truck frame relative to the wheel and axle assembly for adjusting said other end of the member to compensate for the vertical movement of the truck frame and thereby of the pivoted end of the member relative to the wheel and axle assembly to maintain the member out of unwanted engagement with the wheel and axle assembly.

19. In a brake mechanism for railway vehicle truck of the type comprising a wheel and axle assembly and a truck frame which is capable of vertical movement relative to the wheel and axle assembly, in combination, a brake mechanism for said wheel and axle assembly, and a member normally supporting said mechanism and being movable relative to the truck frame by said mechanism when effecting an application of the brakes into engagement with said wheel and axle assembly, said member being pivotally connected at one end to the truck frame for movement by the brake mechanism, means cooperating with said truck frame and wheel and axle assembly normally supporting the other end of said member and operative in response to vertical movement of the truck frame relative to the wheel and axle assembly for adjusting said other end of the member to compensate for the vertical movement of the truck frame and thereby of the pivoted end of the member relative to the wheel and axle assembly to maintain the member out of unwanted engagement with the wheel and axle assembly, and yieldable means through which said means acts to normally support said other end of the member, said yieldable means being adapted to yield to wanted movement of the member into engagement with wheel and axle assembly.

20. In a brake mechanism for a railway vehicle truck of the type comprising a wheel and axle assembly and a truck frame which is capable of vertical movement relative to the wheel and axle assembly, in combination, a brake mechanism for said wheel and axle assembly, and a member normally supporting said mechanism and being movable relative to the truck frame by said mechanism when effecting an application of the brakes into engagement with said wheel and axle assembly, said member being pivotally connected at one end to the truck frame for movement by the brake mechanism, means cooperating with said truck frame and wheel and axle assembly for normally supporting the other end of said member and operative in response to vertical movement of the truck frame relative to the wheel and axle assembly for adjusting said other end of the member to compensate for the vertical movement of the truck frame and thereby of the pivoted end of the member relative to the wheel and axle assembly to maintain the member out of unwanted engagement with the wheel and axle assembly, and a spring through which said means acts to normally support and adjust said other end of the member, said spring being adapted to permit movement of the member into engagement with the wheel and axle assembly by the action of said brake mechanism in effecting an application of the brakes.

21. In a brake mechanism for a railway vehicle truck of the type comprising a wheel and axle assembly and a truck frame which is capable of vertical movement relative to the wheel and axle assembly, in combination, support means carried by said truck frame and cooperating with said wheel and axle assembly for automatic adjustment vertically relative to the truck frame upon vertical movement of the truck frame relative to the wheel and axle assembly, a brake carrier means supported at one end by said supporting means and having at its other end pivotal connection with the truck frame for movement into and out of engagement with the wheel and axle assembly, yieldable means interposed between said support means and the adjacent end of the brake carrier means through which the support means acts to normally support the brake carrier means out of engagement with the wheel and axle assembly, and braking means operative in effecting an application of the brakes for actuating said brake carrier means relative to said support means into engagement with said assembly against the opposing action of said yieldable means.

22. In a brake mechanism for a railway vehicle truck of the type comprising a wheel and axle assembly and a truck frame which is capable of vertical movement relative to the wheel and axle assembly, in combination, support means carried by said truck frame and cooperating with said wheel and axle assembly for automatic adjustment vertically relative to the truck frame upon vertical movement of the track frame relative to the wheel and axle assembly, brake carrier means supported at one end by said supporting means and having at its other end pivotal connection with the truck frame for movement into and out of engagement with the wheel and axle assembly, yieldable means interposed between said support means and the adjacent end of the brake carrier means through which the support means acts to normally support the brake carrier means out of engagement with the wheel and axle assembly, and braking means operative in effecting an application of the brakes for actuating said brake carrier means relative to said supporting means into engagement with said assembly against the opposing action of said yieldable means, said yieldable means being adapted to move the brake carrier means out of engagement with said wheel and axle assembly when said braking means is operated to effect the subsequent release of the brakes.

CARLTON D. STEWART.